United States Patent
Chen

(10) Patent No.: US 11,500,823 B2
(45) Date of Patent: *Nov. 15, 2022

(54) MANAGING CONTAINER-IMAGE LAYERS

(71) Applicant: Red Hat, Inc., Raleigh, NC (US)

(72) Inventor: Huamin Chen, Westboro, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,979

(22) Filed: Mar. 9, 2021

(65) Prior Publication Data

US 2021/0191905 A1    Jun. 24, 2021

Related U.S. Application Data

(63) Continuation of application No. 15/903,082, filed on Feb. 23, 2018, now Pat. No. 10,970,258.

(51) Int. Cl.
*G06F 16/185*     (2019.01)
*G06F 3/06*        (2006.01)
(Continued)

(52) U.S. Cl.
CPC .......... *G06F 16/185* (2019.01); *G06F 3/0605* (2013.01); *G06F 3/0643* (2013.01);
(Continued)

(58) Field of Classification Search
CPC .... G06F 3/0605; G06F 3/0643; G06F 3/0649; G06F 16/13; G06F 16/288; G06F 16/185
See application file for complete search history.

(56) References Cited

U.S. PATENT DOCUMENTS 8,504,771 B2   8/2013  Dawkins
8,843,459 B1   9/2014  Aston et al.
(Continued)

FOREIGN PATENT DOCUMENTS

CN    106227579 A    12/2016

OTHER PUBLICATIONS

Agarwal, N., "Docker Container's Filesystem Demystified," Medium Corporation, Jan. 22, 2017 https//medium.com/@nagarwal/docker-containers-filesystem-demystified-b6ed8112a04a.
(Continued)

*Primary Examiner* — Ryan Bertram
(74) *Attorney, Agent, or Firm* — Kilpatrick Townsend & Stockton LLP

(57) ABSTRACT

Container-image layers can be managed. For example, a computing device can determine a first score for a first layer of a container image and a second score for a second layer of the container image. The computing device can determine that the first score corresponds to a first storage destination among several possible storage destinations. The computing device can also determine that the second score corresponds to a second storage destination among the possible storage destinations. The second storage destination can be different from the first storage destination. The computing device can then store (i) the first layer in the first storage destination based on the first layer being correlated to the first score, and (ii) the second layer in the second storage destination based on the second layer being correlated to the second score.

20 Claims, 4 Drawing Sheets

(51) Int. Cl.
*G06F 16/13* (2019.01)
*G06F 16/28* (2019.01)

(52) U.S. Cl.
CPC ............ *G06F 3/0649* (2013.01); *G06F 16/13* (2019.01); *G06F 16/288* (2019.01)

(56) References Cited

U.S. PATENT DOCUMENTS

| | | | |
|---|---|---|---|
| 9,021,204 | B1 | 4/2015 | Awasthi et al. |
| 9,355,248 | B1 | 5/2016 | Wiest et al. |
| 9,569,180 | B1 | 2/2017 | Jiang et al. |
| 9,632,707 | B2 | 4/2017 | Hyde et al. |
| 10,175,886 | B1 | 1/2019 | Kantor et al. |
| 10,291,706 | B1 | 5/2019 | Zhao et al. |
| 10,528,337 | B1 * | 1/2020 | Varadharajan Kannan ................. G06F 8/71 |
| 10,659,533 | B1 | 5/2020 | Zhao et al. |
| 10,768,973 | B1 * | 9/2020 | Jin ........................ G06F 16/178 |
| 2013/0006948 | A1 | 1/2013 | Shmueli |
| 2014/0172808 | A1 | 6/2014 | Burge |
| 2015/0304450 | A1 | 10/2015 | Van Bemmel |
| 2015/0378831 | A1 | 12/2015 | Tarasuk-Levin et al. |
| 2016/0094661 | A1 | 3/2016 | Jain et al. |
| 2016/0205518 | A1 | 7/2016 | Patel et al. |
| 2016/0261684 | A1 | 9/2016 | Khalaf et al. |
| 2016/0378676 | A1 | 12/2016 | Uriel |
| 2016/0381075 | A1 | 12/2016 | Goyal et al. |
| 2017/0034023 | A1 | 2/2017 | Nickolov et al. |
| 2017/0052772 | A1 | 2/2017 | Chen et al. |
| 2017/0147335 | A1 | 5/2017 | Parees et al. |
| 2017/0177877 | A1 | 6/2017 | Suarez et al. |
| 2017/0180346 | A1 | 6/2017 | Suzrez et al. |
| 2017/0223033 | A1 | 8/2017 | Wager et al. |
| 2017/0255462 | A1 | 9/2017 | Azagury et al. |
| 2017/0329635 | A1 | 11/2017 | Rathke |
| 2018/0095973 | A1 | 4/2018 | Huang et al. |
| 2018/0189121 | A1 | 7/2018 | Jobi et al. |
| 2018/0276215 | A1 | 9/2018 | Chiba et al. |
| 2018/0322675 | A1 | 11/2018 | Cao et al. |
| 2018/0341471 | A1 | 11/2018 | Stefanov et al. |
| 2018/0349150 | A1 | 12/2018 | Wong et al. |
| 2020/0257569 | A1 * | 8/2020 | Eom ..................... G06F 16/188 |

OTHER PUBLICATIONS

Du, L., et al., "Cider: a Rapid Docker Container Deployment System Through Sharing Network Storage," State Key Laboratory of Software Development Environment BDBC Beihang University, Beijing, China, 2017, http://act.buaa.edu.cn/yangrenyu/paper/hpcc2017.pdf.

"About Images, Containers, and Storage Drivers," Docker Inc., 2018, https://docs.docker.com/engine/userguide/storagedriver/imagesandcontainers/.

* cited by examiner

118

Table 202

| | | |
|---|---|---|
| 0-50 | —— | Storage Destination A |
| 51-100 | —— | Storage Destination B |
| 101-300 | —— | Storage Destination C |
| 301-700 | —— | Storage Destination D |

Table 204

| | | |
|---|---|---|
| Storage Destination A | —— | Storage Driver A |
| Storage Destination B | —— | Storage Driver B |
| Storage Destination C | —— | Storage Driver C |
| Storage Destination D | —— | Storage Driver D |

FIG. 2

MANAGING CONTAINER-IMAGE LAYERS

REFERENCE TO RELATED APPLICATION

This is a continuation of U.S. patent application Ser. No. 15/903,082, titled "Managing Container-Image Layers" and filed on Feb. 23, 2018, the entirety of which is hereby incorporated by reference herein.

TECHNICAL FIELD

The present disclosure relates generally to file management. More specifically, but not by way of limitation, this disclosure relates to managing container-image layers.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into isolated virtual-environments called "containers." Containers can be deployed from image files, which can be referred to as images.

An image can include multiple layers of software or libraries, along with metadata indicating a relationship between the layers. Images are typically stored in a registry (e.g., Docker Hub™) that is maintained by a server, which stores all of the layers for a particular image together in the same storage device, such as a local hard disk.

BRIEF DESCRIPTION OF THE DRAWINGS

FIG. 2 is a block diagram of an example of one or more databases according to some aspects.

DETAILED DESCRIPTION

Figure 1:
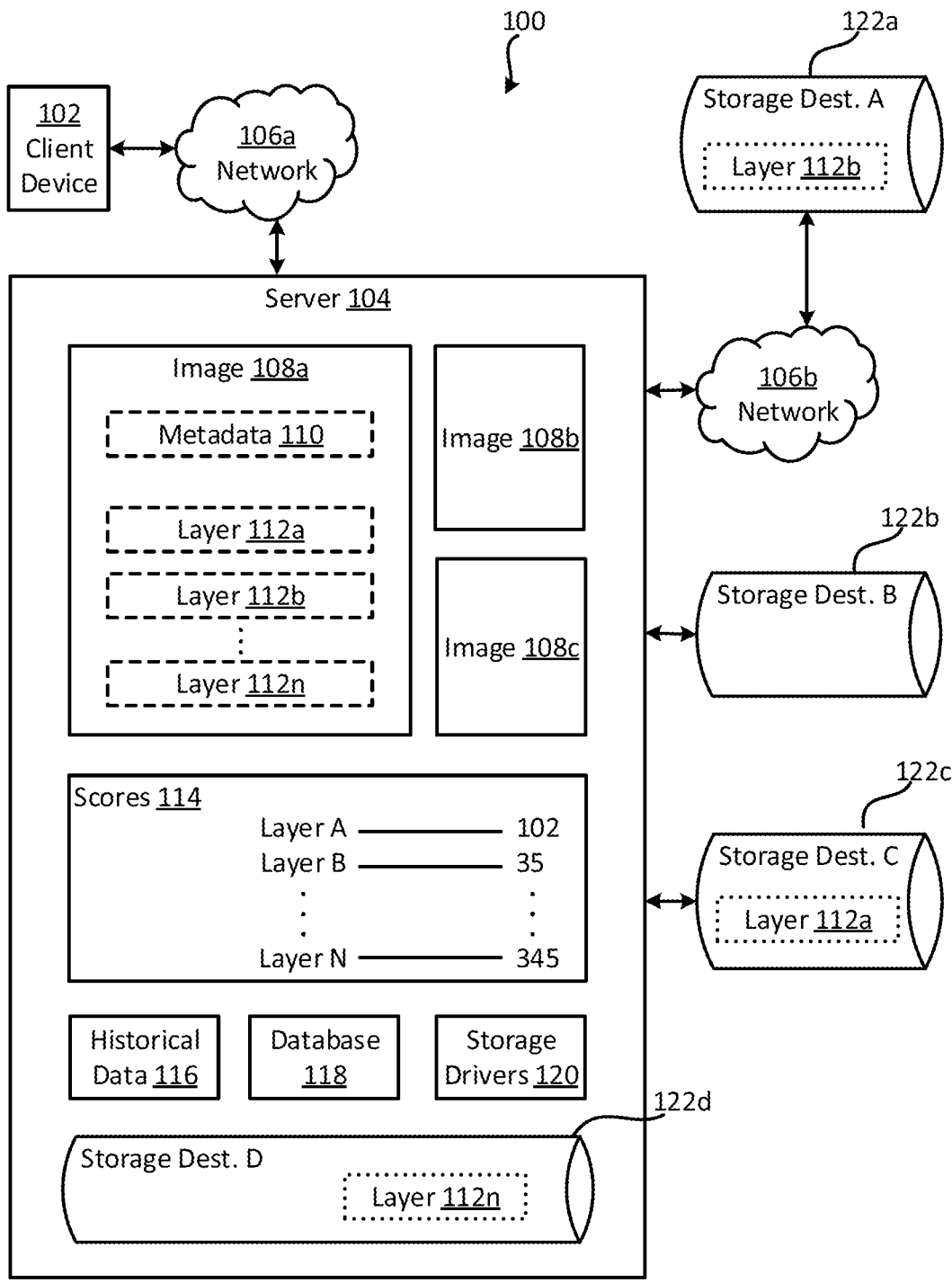
FIG. 1 is a block diagram of an example of a system for managing container-image layers according to some aspects.

There can be disadvantages to storing all of the layers for an image in the same storage device. For example, some layers of the image may be shared among (e.g., included in) multiple images and may therefore be accessed more frequently than other layers of the image. But storing all of the layers of the image in the same storage device ignores these different access rates and treats all of the layers of the image equally. This may unnecessarily consume valuable storage-space with relatively unused image-layers. For example, storing all of the layers for a group of images on a local hard disk may unnecessarily consume local hard-disk space with dozens or hundreds of relatively unused image-layers. And local hard-disk space may be limited and highly valuable due to its low latency as compared to other storage options, so such unnecessary consumption of local hard-disk space may be undesirable.

Some examples of the present disclosure overcome one or more of the abovementioned issues by (i) determining a score for each layer of an image based on the usage (e.g., popularity, accesses, or downloads) of that layer, the image, or both; and (ii) storing each layer at a particular storage destination based on the layer's score. Higher-scoring layers can be stored in storage destinations that have higher performance characteristics, such as faster input/output times, fewer input/output errors, etc. Examples of storage destinations with higher performance characteristics can include solid state drives (SSDs) and local hard drives. Additionally or alternatively, lower-scoring layers can be stored in storage destinations that have lower performance characteristics. Examples of storage destinations with lower performance characteristics can include remote cloud storage and optical disks. By storing higher-scoring layers in storage destinations with higher performance characteristics, more-frequently accessed layers can be kept more highly available (e.g., more quickly accessible with fewer errors). And storing lower-scoring layers in storage destinations with lower performance characteristics can help free up the higher-performance storage destinations.

As a particular example, an image can have a first layer that is shared with another image and a second layer that is not shared with any other images. Because the first layer is shared with another image, the first layer may be more frequently used than the second layer. In some examples, a computing device can determine that the first layer has a first score and the second layer has a second score that is less than the first score, because the second layer is less frequently used than the first layer. The computing device can determine that the first score corresponds to a local (e.g., higher performance) storage destination and the second score corresponds to a remote (e.g., lower performance) storage destination. The computing device can then store the first layer at the local storage destination and the second layer at the remote storage destination. This can help ensure that the first layer remains highly available to quickly service requests for the first layer. This can also help ensure that the second layer remains accessible, albeit at a slower speed, without consuming valuable storage space in the local storage destination.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing container-image layers according to some aspects. The system 100 includes a client device 102, such as a laptop computer, desktop computer, mobile device, or any combination of these. The client device 102 is in in communication with a server 104 via a network 106a, such as a local area network (LAN), a wide area network (WAN), the Internet, or any combination of these.

The server 104 includes any number and combination of images, such as images 108a-c. The images can be for deploying containers in a computing environment. Each image can include two or more layers. For example, image 108a includes layers 112a-n. Each image can also include metadata expressing a relationship between the layers of the image. For example, image 108a can include metadata 110, which can express a relationship between layers 112a-n.

The server 104 can determine scores 114 for the layers 112a-n of an image 108a. In some examples, the server 104 can determine a score for a layer 112a based on overall scores for at least two images that share the layer 112a. For example, the server 104 can determine an overall score for image 108a by analyzing historical data 116 indicating usage of the image 108a over a prior time-period, such as a day, week, month, or year. The historical data 116 may include popularity rankings for the image 108a, downloads of the image 108a, deployment of the image 108a, or any combination of these. In one particular example, the server 104 can determine an overall score of 62 for the image 108a by analyzing popularity rankings of the image 108a over the previous year. Additionally, the server 104 can determine another overall score for another image 108b that also includes the layer 112a by analyzing historical data 116 indicating usage of the image 108b over the prior time-period. For example, the server 104 can determine another overall score of 40 for image 108b by analyzing popularity rankings of the image 108b over the previous year. The server 104 can then determine a score for layer 112a by combining the two overall scores for the images 108a-b. For example, the server 104 can determine that layer 112a has a score of 102 by adding together the overall score of 62 with the overall score of 40. The server 104 can combine any number and combination of overall scores for any number and combination of images to determine a score for a layer.

In some examples, the server 104 can determine an overall score for an image 108a by weighting one or more data points in the historical data 116. For example, the server 104 can use the following equation to determine the overall score for the image 108a:

Overall Score=$C1$*Ranking_Today+
$C2$*Ranking_LastWeek+$C3$*Ranking_LastMo+
$C4$*Ranking_lastYr where $C1$, $C2$, $C3$, and $C4$ are weights (coefficients); Ranking_Today is a ranking of the image 108a as of today; Ranking_LastWeek is a ranking of the image 108a as of last week; Ranking_LastMo is a ranking of the image 108a as of last month; and Ranking_LastYr is a ranking of the image 108a as of last year. A higher ranking may indicate higher popularity or more frequent accesses, while a lower ranking may indicate lower popularity or less frequent accesses. In this example, $C1$ may have a higher value than $C2$, which may have a higher value than $C3$, which may have a higher value than $C4$. This configuration of weights can prioritize recent data points over older data points. But other examples can involve any number and combination data points (e.g., other than four) in the historical data 116 being weighted in any suitable manner.

Additionally or alternatively, the server 104 can determine a score for a layer 112a by analyzing historical data 116 indicating usage of the layer 112a at various points in time during a prior time-period. The historical data 116 can include popularity rankings for the layer 112a, downloads of the layer 112a, deployment of one or more images including the layer 112a, or any combination of these. The server 104 may determine a higher score if the historical data 116 indicates a higher level of usage, and a lower score if the historical data 116 indicates a lower level of usage. In some examples, the server 104 can determine a score for the layer 112a based on weighted (or unweighted) values of data points in the historical data 116 (e.g., similar to the above equation for determining the overall score for image 108a).

After determining a score for a layer 112a of the image 108a, the server 104 can determine a storage destination for the layer 112a based on the score. In some examples, the server 104 can determine the storage destination using a database 118. One example of the database 118 is shown in FIG. 2. In the example shown in FIG. 2, the database 118 includes table 202. Table 202 can include any number and combination of relationships between (i) ranges of scores for images layers, and (ii) storage destinations for the image layers. The server 104 can access the table 202 and determine that, for example, layer 112a is to be stored in Storage Destination C based on layer 112a having a score of 102, which is between 101 and 300. The server 104 can additionally or alternatively determine that layer 112b is to be stored in Storage Destination A based on layer 112b having a score of 35, which is between zero and 50. The server 104 can additionally or alternatively determine that layer 112n is to be stored in Storage Destination D based on layer 112n having a score of 345, which is between 301 and 700.

Returning to FIG. 1, the server 104 can be in communication with any number and combination of storage destinations 122a-d for storing image layers. The storage destinations 122a-d can include virtual storage volumes, hard disks, SSDs, cloud storage, or any combination of these. In FIG. 1, the server 104 is indirectly coupled to storage destination 122a via network 106b, such as a LAN, WAN, or the Internet. The storage destination 122a can be, for example, cloud storage that is remote from the physical infrastructure housing the server 104 and accessible to the server 104 via the Internet. A storage destination that is remote from the physical infrastructure housing the server 104 can be referred to as a remote storage destination. In FIG. 1, the server 104 is also directly coupled to storage destinations 122b-c via a wired or wireless interface, such as Bluetooth. Storage destinations 122b-c can be internal to the physical infrastructure that houses the server 104. A storage destination that is internal to the physical infrastructure that houses the server 104 can be referred to as a local storage destination. Local storage destinations may have lower latency than remote storage destinations. The server 104 is also coupled to storage destination 122d, such as a SSD or hard disk, which is internal to the server 104. A storage destination that is internal to the server 104 can be referred to as an internal storage destination. Internal storage destinations may have lower latency than local storage destinations.

After determining the storage destination for a layer, the server 104 can store the layer at the storage destination. For example, the server 104 can store layer 112a at Storage Destination C, layer 112b at Storage Destination A, and layer 112n at Storage Destination D. Storing a layer at a storage destination can involve communicating with the storage destination or computing device associated with the storage destination. For example, if Storage Destination A is a remote cloud-computing environment, the server 104 can communicate with a node in the cloud-computing environment to cause the layer 112b to be stored in the cloud-computing environment.

In some examples, storing a layer at a storage destination can involve executing a storage driver associated with the storage destination. A storage driver can be a software interface that uses a particular protocol for storing data in a particular storage destination. Examples of storage drivers can include a virtual file system (VFS) driver or an object-storage driver (e.g., a cloud-storage driver or a blob-storage driver). The server 104 can have multiple storage drivers 120, with each storage driver being for storing data in a respective storage destination. The server 104 may determine the appropriate storage driver to use for a particular storage destination using the database 118. For example, the database 118 can include table 204 shown in FIG. 2. Table 204 can include any number and combination of relationships between storage destinations and storage drivers. The server 104 can use table 204 to determine that, for example, Storage Driver C is to be used to store layer 112a at Storage Destination C. The server 104 can then execute Storage Driver C to store layer 112a at Storage Destination C. The server 104 can additionally or alternatively perform similar steps to store layer 112b at Storage Destination A and layer 112n at Storage Destination D. An example of the layers 112a-n stored in the respective storage destinations is depicted in FIG. 1 using dotted boxes.

At a subsequent point in time, the client device 102 may request the image 108a. The server 104 can respond to the request by retrieving the layers 112a-n for the image 108a from the various storage destinations (e.g., storage destination 122a, 122c, and 122d) and routing the layers 112a-n to the client device 102. For example, the server 104 can store a location identifier for each layer in a database, such as database 118. The location identifier can include a name, Internet Protocol address, reference number, or other indicator of a storage destination at which the layer is stored. Then, if the server 104 receives a request for the image 108a from a client device 102, the server 104 can respond to the request by determining the various locations of the layers 112a-n using the database, retrieving the layers 112a-n from the locations, and transmitting the layers 112a-n back to the client device 102.

The example shown in FIG. 1 is illustrative, but various modifications are possible. For example, although FIG. 1 shows one client device 102, the system 100 can include any number and combination of client devices. The system 100 can also include any number and combination of storage destinations communicatively coupled to the server 104 in any suitable manner. While FIG. 1 shows historical data 116 as a single box, historical data 116 can represent any amount and combination of historical data for images, layers, or both. Likewise, while FIG. 1 shows database 118 as a single box, database 118 can represent any amount and combination of databases having any amount and combination of the data discussed above. For example, database 118 can represent a first database with table 202 and a second database with table 204. Further, while certain components are depicted in FIG. 1 as being internal or external to the server 104, other examples can involve other configurations of the components. For example, the database 118, historical data 116, scores 114, or any combination of these can be separate from the server 104 and accessible to the server 104 via a network.

Figure 3:
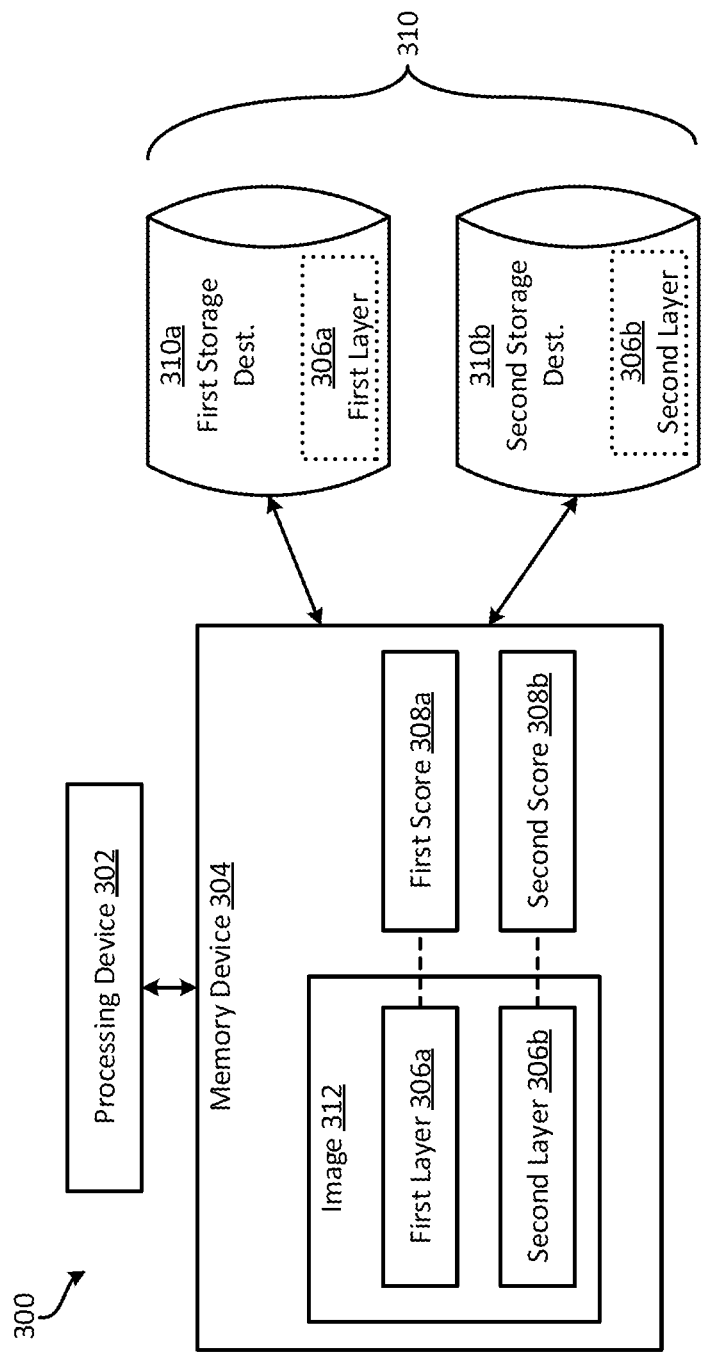
FIG. 3 is a block diagram of another example of a system for managing container-image layers according to some aspects.

FIG. 3 is a block diagram of another example of a system 300 for managing container-image layers according to some aspects. The system 300 includes a processing device 302 communicatively coupled to a memory device 304. In some examples, the processing device 302 and the memory device 304 can be housed in a single device, such as server 104. In other examples, the processing device 302 and the memory device 304 can be distributed from one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions stored in the memory device 304 to perform operations. In some examples, the instructions can include processor-specific instructions generated by a compiler or an interpreter from code written in any suitable computer-programming language, such as C, C++, C #, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions.

The memory device 304 includes an image 312 having a first layer 306a and a second layer 306b. In some examples, the first layer 306a can be for an operating system, such as the Linux operating system. The second layer 306b can include binary files, libraries, applications, or any combination of these. The image 312 may include additional or alternative layers in other examples.

The processing device 302 can determine scores 308a-b for the layers 306a-b. The scores 308a-b can reflect a prioritization among the layers 306a-b. For example, the processing device 302 can determine a first score 308a for the first layer 306a that is higher than a second score for the second layer 308. This may indicate that the first layer 306a has a higher priority than the second layer 308, which in turn may indicate that the first layer 306a should be stored in a storage destination with higher performance characteristics than the second layer 306b.

The processing device 302 can determine the scores 308a-b by analyzing historical data related to the image 312, the layers 308a-b, or both. Alternatively, the processing device 302 can receive user input indicating the scores 308a-b for the layers 306a-b. This may enable a user to customize the scores for the layers 306a-b and thereby manually prioritize the layers 306a-b. The processing device 302 can use any number and combination of approaches to determine the scores 308a-b for the layers 306a-b.

After determining the scores 308a-b, the processing device 302 can determine that the first score 308a corresponds to a first storage destination 310a among multiple possible storage destinations 310. Additionally or alternatively, the processing device 302 can determine that the second score 308b corresponds to a second storage destination 310b among the multiple possible storage destinations 310. In some examples, the processing device 302 can determine that the first score 308a corresponds to the first storage destination 310a or the second score 308b corresponds to the second storage destination 310b using a database, such as database 118 in FIG. 1. The processing device 302 can then store the first layer 306a in the first storage destination 310a based on the first layer 306a being correlated to the first score 308a, the second layer 306b in the second storage destination 310b based on the second layer 306b being correlated to the second score 308b, or both of these.

In some examples, the processing device 302 can determine that a layer of an image is to be stored in a particular storage destination, but the particular storage destination may have insufficient capacity to store the layer (e.g., the storage destination may be full). So, the processing device 302 may select an alternative storage destination at which to store the layer. For example, the processing device 302 may communicate with a particular storage destination to determine if there is sufficient capacity to store the layer, prior to attempting to store the layer in the particular storage destination. If the processing device 302 determines that there is insufficient capacity to store the layer, the processing device 302 can determine an alternative storage destination at which to store the layer. The processing device 302 can then communicate with the alternative storage destination to determine if there is sufficient capacity to store the layer, prior to attempting to store the layer in the alternative storage destination. The processing device 302 can repeat this process until it identifies a storage location with sufficient capacity to store the layer. The processing device 302 can then store the layer at that storage location.

In some examples, the processing device 302 can determine that an alternative storage destination is to be the next-best storage location (e.g., as determined according to the performance characteristics of the storage destinations). For example, storage destinations can be ranked according to the performance characteristics of the storage destinations. If a particular storage destination has insufficient capacity for a layer, the processing device 302 can select the next-highest ranked storage destination as the alternative storage destination. As a specific example, the storage destinations in table 202 of FIG. 2 are listed in order of desirability, with lower-listed storage destinations (e.g., Storage Destination D) having better performance characteristics than higher-listed storage destinations (e.g., Storage Destination A). If a particular storage destination is listed in a certain row in the database 118, but the particular storage destination is full, the processing device 302 may select a storage destination listed in an immediately prior row of the database 118 for use as the alternative storage destination. The processing device 302 can use any number and combination of techniques to identify an alternative storage destination.

Figure 4:
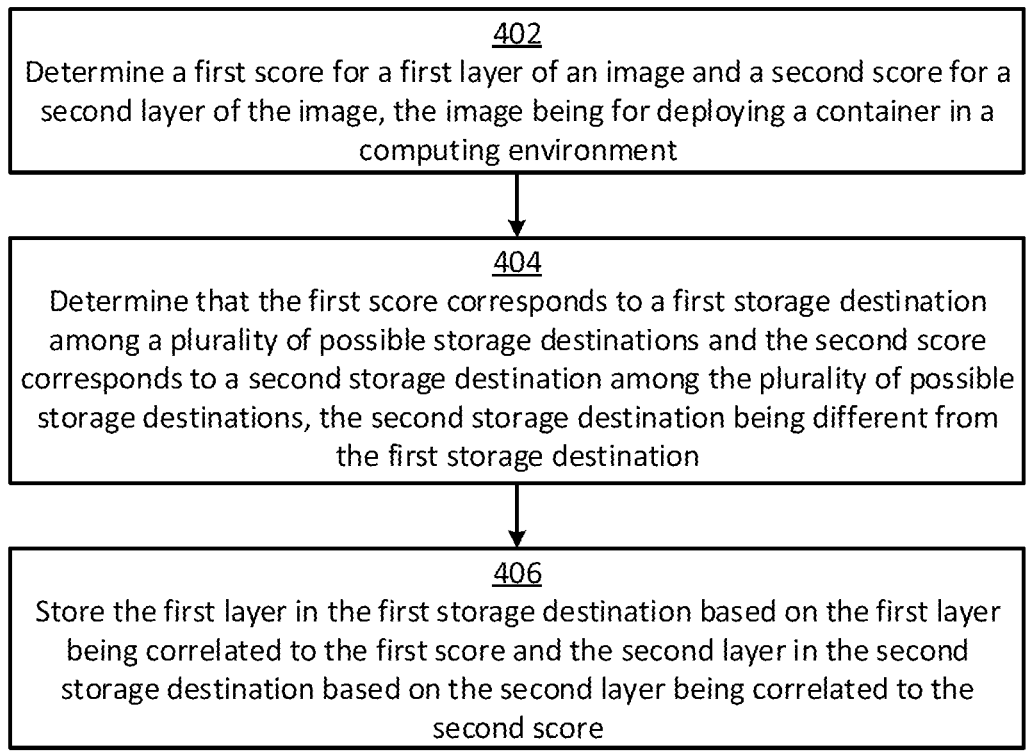
FIG. 4 is a flow chart of an example of a process for managing container-image layers according to some aspects.

In some examples, the system 300 can implement the process shown in FIG. 4. Other examples can include more steps, fewer steps, different steps, or a different order of the steps than are depicted in FIG. 4. The steps of FIG. 4 are described with reference to the components discussed above with regard to FIG. 3.

In block 402, the processing device 302 determines a first score 308a for a first layer 306a of an image 312 and a second score 308b for a second layer 306b of the image 312. The image 312 can be for deploying a container in a computing environment. In some examples, the processing device 302 can determine the scores 308a-b using any method or combination of methods discussed above.

In block 404, the processing device 302 determines that the first score 308a corresponds to a first storage destination 310a among multiple possible storage destinations 310 and the second score 308b corresponds to a second storage destination 310b among the multiple possible storage destinations 310. For example, the processing device 302 can determine that the first score 308a falls within a range of scores associated with the first storage destination 310a, and the second score falls within another range of scores associated with the second storage destination 310b. In some examples, the processing device 302 can determine that the scores 308a-b correspond to the storage destinations 310a-b using any method or combination of methods discussed above.

In block 406, the processing device 302 stores the first layer 306a in the first storage destination 310a based on the first layer 306a being correlated to the first score 308a and the second layer 306b in the second storage destination 310b based on the second layer 306b being correlated to the second score 308b. Storing a layer in a storage destination can involve communicating with the storage destination or communicating with a computing device that manages the storage destination. For example, the processing device 302 can store the first layer 306a in the first storage destination 310a by transmitting the first layer 306a to a server that manages the first storage destination 310a, which can cause the server to store the first layer 306a in the first storage destination 310a. In some examples, the processing device 302 can store the layers 306a-b in the storage destinations 310a-b using any method or combination of methods discussed above.

Although the above examples relate to an image for a container, other examples can involve any type of file capable of being divided into subcomponents. For example, the processing device 302 can determine that a first component of a file has a first score and a second component of the file has a second score. The processing device 302 can then determine that the first score corresponds to the first storage destination 310a and the second score corresponds to the second storage destination 310b. The processing device 302 can then store the first component in the first storage destination 310a and the second component in the second storage destination 310b. In some examples, the processing device 302 can perform some or all of these steps using any method or combination of methods discussed above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions that are executable by the processing device for causing the processing device to:
   determine an overall score for a file based on historical data indicating usage of the file during a prior time-period;
   determine a first score for a first component of the file based on the overall score;
   determine a second score for a second component of the file, the first score being higher than the second score;
   determine that the first score corresponds to a first storage destination and that the second score corresponds to a second storage destination, the first storage destination having higher performance characteristics than the second storage destination; and
   store the first component in the first storage destination based on determining that the first score corresponds to the first storage destination and store the second component in the second storage destination based on determining that the second score corresponds to the second storage destination.

2. The system of claim 1, wherein the memory device further includes instructions that are executable by the processing device for causing the processing device to determine the overall score for the file by:

determining, based on the historical data, a first value indicating a first ranking for the file at a first point in time during the prior time-period;

determining, based on the historical data, a second value indicating a second ranking for the file at a second point in time that is before the first point in time in the prior time-period;

determining a first weighted value by multiplying the first value by a first weighting factor;

determining a second weighted value by multiplying the second value by a second weighting factor that is less than the first weighting factor; and determining the overall score by adding the first weighted value to the second weighted value.

3. The system of claim 1, wherein the overall score is a first overall score, the file is a first file, and the memory device further includes instructions that are executable by the processing device for causing the processing device to:

determine that a second file also includes the first component;

determine a second overall score for the second file; and determine the first score for the first file using (i) the first overall score for the first file, and (ii) the second overall score for the second file.

4. The system of claim 1, wherein the usage of the file during the prior time-period comprises downloads of the file at multiple points during the prior time-period.

5. The system of claim 1, wherein the memory device further includes instructions that are executable by the processing device for causing the processing device to:

determine that the first score corresponds to the first storage destination using a database that includes relationships between (i) ranges of scores for file components, and (ii) storage destinations for the file components; and determine that the second score corresponds to the second storage destination using the database.

6. The system of claim 1, wherein the memory device further includes instructions that are executable by the processing device for causing the processing device to:

store the first component at the first storage destination using a first storage driver; and store the second component that the second storage destination using a second storage driver that is different from the first storage driver.

7. The system of claim 6, wherein the memory device further includes instructions that are executable by the processing device for causing the processing device to:

determine that the first storage driver is to be used to store the first component at the first storage destination by mapping the first storage destination to the first storage driver using a database that includes relationships between (i) storage drivers, and (ii) storage destinations at which the storage drivers can store data; and determine that the second storage driver is to be used to store the second component at the second storage destination using the database.

8. The system of claim 1, wherein the memory device further includes instructions that are executable by the processing device for causing the processing device to:

receive a request for the file from a client device;

determine that the first component is stored in the first storage destination using a first location identifier for the first component in a database;

determine that the second component is stored in the second storage destination using a second location identifier for the second component in the database;

based on determining that the first component is stored in the first storage destination and the second component is stored in the second storage destination, retrieve the first component from the first storage destination and the second component from the second storage destination; and in response to retrieving the first component from the first storage destination and the second component from the second storage destination, transmit the first component and the second component to the client device.

9. A method comprising:

determining, by a processing device, an overall score for a file based on historical data indicating usage of the file during a prior time-period determining, by the processing device, a first score for a first component of the file based on the overall score;

determining, by the processing device, a second score for a second component of the file, the first score being higher than the second score;

determining, by the processing device, that the first score corresponds to a first storage destination and that the second score corresponds to a second storage destination, the first storage destination having higher performance characteristics than the second storage destination;

storing, by the processing device, the first component in the first storage destination based on determining that the first score corresponds to the first storage destination; and storing, by the processing device, the second component in the second storage destination based on determining that the second score corresponds to the second storage destination.

10. The method of claim 9, further comprising:

determining, based on the historical data, a first value indicating a first ranking for the file at a first point in time during the prior time-period;

determining, based on the historical data, a second value indicating a second ranking for the file at a second point in time that is before the first point in time in the prior time-period;

determining a first weighted value by multiplying the first value by a first weighting factor;

determining a second weighted value by multiplying the second value by a second weighting factor that is less than the first weighting factor; and determining the overall score by adding the first weighted value to the second weighted value.

11. The method of claim 9, wherein the overall score is a first overall score and the file is a first file, and further comprising:

determining that a second file also includes the first component;

determining a second overall score for the second file; and determining the first score for the first component using (i) the first overall score for the first file, and (ii) the second overall score for the second file.

12. The method of claim 9, further comprising:

determining that the first score corresponds to the first storage destination using a database that includes relationships between (i) ranges of scores for file components, and (ii) storage destinations for the file components; and determining that the second score corresponds to the second storage destination using the database.

13. The method of claim 9, further comprising:
storing the first component at the first storage destination using a first storage driver; and
storing the second component that the second storage destination using a second storage driver that is different from the first storage driver.

14. The method of claim 9, wherein the usage of the file during the prior time-period comprises downloads of the file at multiple points during the prior time-period.

15. The method of claim 9, further comprising:
receiving a request for the file from a client device;
determining that the first component is stored in the first storage destination using a first location identifier for the first component in a database;
determining that the second component is stored in the second storage destination using a second location identifier for the second component in the database;
based on determining that the first component is stored in the first storage destination and the second component is stored in the second storage destination, retrieving the first component from the first storage destination and the second component from the second storage destination; and
in response to retrieving the first component from the first storage destination and the second component from the second storage destination, transmitting the first component and the second component to the client device.

16. A non-transitory computer-readable medium comprising program code that is executable by a processing device for causing the processing device to:
determine an overall score for a file;
determine a first score for a first component of the file based on the overall score;
determine a second score for a second component of the file, the second score being higher than the first score;
determine that the first score corresponds to a first storage destination;
determine that the second score corresponds to a second storage destination that is different from the first storage destination, the second storage destination having higher performance characteristics than the first storage destination;
store the first component in the first storage destination based on determining that the first score corresponds to the first storage destination; and
store the second component in the second storage destination based on determining that the second score corresponds to the second storage destination.

17. The non-transitory computer-readable medium of claim 16, further comprising program code that is executable by the processing device for causing the processing device to:
determine a first value indicating a first ranking for the file;
determine a second value indicating a second ranking for the file;
determine a first weighted value by multiplying the first value by a first weighting factor;
determine a second weighted value by multiplying the second value by a second weighting factor that is less than the first weighting factor; and
determine the overall score by adding the first weighted value to the second weighted value.

18. The non-transitory computer-readable medium of claim 16, further comprising program code that is executable by the processing device for causing the processing device to:
determine that the first score corresponds to the first storage destination using a database that includes relationships between (i) ranges of scores for file components, and (ii) storage destinations for the file components; and
determine that the second score corresponds to the second storage destination using the database.

19. The non-transitory computer-readable medium of claim 16, further comprising program code that is executable by the processing device for causing the processing device to determine the overall score based on historical data associated with the file.

20. The non-transitory computer-readable medium of claim 16, further comprising program code that is executable by the processing device for causing the processing device to:
receive a request for the file from a client device;
determine that the first component is stored in the first storage destination using a first location identifier for the first component in a database;
determine that the second component is stored in the second storage destination using a second location identifier for the second component in the database;
based on determining that the first component is stored in the first storage destination and the second component is stored in the second storage destination, retrieve the first component from the first storage destination and the second component from the second storage destination; and
in response to retrieving the first component from the first storage destination and the second component from the second storage destination, transmit the first component and the second component to the client device.

* * * * *